(12) United States Patent
Sano et al.

(10) Patent No.: US 10,393,226 B2
(45) Date of Patent: Aug. 27, 2019

(54) CHAIN

(71) Applicant: TSUBAKIMOTO CHAIN CO., Osaka-shi, Osaka (JP)

(72) Inventors: Hirokazu Sano, Osaka (JP); Akihiko Utaki, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 165 days.

(21) Appl. No.: 15/433,080

(22) Filed: Feb. 15, 2017

(65) Prior Publication Data

US 2017/0234403 A1    Aug. 17, 2017

(30) Foreign Application Priority Data

Feb. 17, 2016   (JP) .................. 2016-027789

(51) Int. Cl.
*F16G 13/06*   (2006.01)

(52) U.S. Cl.
CPC .................... *F16G 13/06* (2013.01)

(58) Field of Classification Search
CPC .......... F16G 13/06; F16G 13/02; F16G 13/07; F16G 13/08
See application file for complete search history.

(56) References Cited

U.S. PATENT DOCUMENTS

| | | | | |
|---|---|---|---|---|
| 6,220,981 B1 * | 4/2001 | Yoshida | ................ | F16G 13/06 474/111 |
| 8,708,850 B2 * | 4/2014 | Tohara | ................ | F16G 13/18 474/206 |
| 9,109,657 B2 * | 8/2015 | Bodensteiner | .......... | F16G 13/02 |
| 9,856,942 B2 * | 1/2018 | Rampp | ................ | F16G 13/06 |
| 2008/0020882 A1 | 1/2008 | Tohara et al. | | |
| 2011/0263369 A1 | 10/2011 | Kurihara | | |

FOREIGN PATENT DOCUMENTS

| | | |
|---|---|---|
| JP | 2000-2304 A | 1/2000 |
| JP | 2003-176853 A | 6/2003 |
| JP | 2008-25744 A | 2/2008 |
| KR | 10-2011-0119544 A | 11/2011 |

OTHER PUBLICATIONS

Office Action dated Sep. 28, 2018, issued in counterpart Chinese Application No. 201710078990.4, with machine translation. (8 pages).

* cited by examiner

*Primary Examiner* — Michael R Mansen
*Assistant Examiner* — Robert T Reese
(74) *Attorney, Agent, or Firm* — Westerman, Hattori, Daniels & Adrian, LLP

(57) ABSTRACT

Provided is a chain that can reduce friction resistance between the running chain and a chain guide with a simple structure. The chain 10 is formed of a plurality of plates 30, 50 including sliding plates 30 that are slidably guided by a chain guide G, the plates being coupled together with connecting pins 40 such that the chain is bendable. The sliding plates 30 each include a guide-side end face 31, and the guide-side end face 31 includes a recessed section 32 formed by cutting away part of the guide-side end face 31, and a guide sliding section 33 located on a front side in a chain running direction of the recessed section 32. The recessed section 32 includes a negative pressure canceling surface 32a at a front end thereof in the chain running direction.

3 Claims, 5 Drawing Sheets

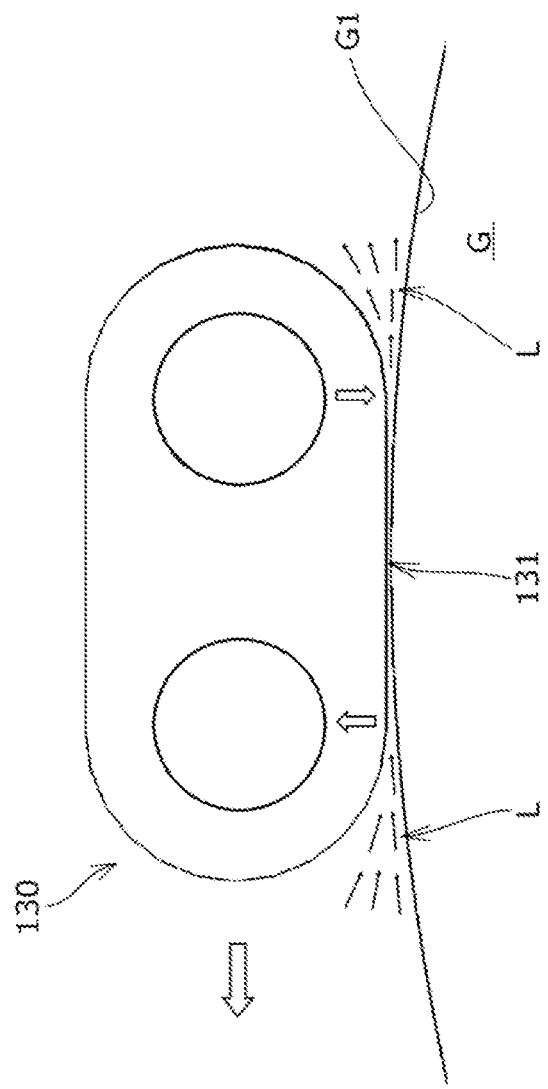

CHAIN

BACKGROUND OF THE INVENTION

1. Field of the Invention

The present invention relates to a chain having sliding plates that are slidably guided by a chain guide.

2. Description of the Related Art

Generally, power transmission mechanisms of cars or industrial machines and the like, or, conveyors and the like, are provided with a transmission device that transmits power via a chain passing over a drive sprocket and a driven sprocket. For example, a car engine is equipped with a timing drive system that transmits power via a chain passing over a crank sprocket (drive sprocket) and a cam sprocket (driven sprocket). This chain is slidably guided by a chain guide.

As one of conventional chains that have sliding plates slidably guided by a chain guide, one that is formed of substantially oval outer plates and inner plates having parallel upper end faces and lower end faces is known, wherein the upper end face of the outer plates is positioned lower than the upper end face of the inner plates when the outer plates and inner plates are arranged such that the pitch lines connecting the centers of their pin holes and bushing holes are straight and horizontal (see, for example, Japanese Patent Application Laid-open No. 2003-176853).

In this chain described in Japanese Patent Application Laid-open No. 2003-176853, since the upper end face of the plates that slide on the chain guide is formed straight, the sliding area between the chain guide and each plate is large, and the friction loss is large because of high sliding resistance when the chain runs. When used for a timing drive system, for example, the chain could cause a large power loss of the car engine and reduce fuel economy.

As one of the chains designed to solve the problem of friction loss described above, one that has plates with a convexly curved end face on the side where they are slidably guided by a chain guide is known (see, for example, Japanese Patent Application Laid-open No. 2008-025744).

Since the chain described in Japanese Patent Application Laid-open No. 2008-025744 is formed of plates 130 that have a convexly curved guide-side end face 131 as shown in FIG. 5, the sliding area between the plate 130 and the chain guide G is reduced, which in turn reduces the friction resistance when the chain runs, as well as provides the effects described below.

Namely, in the chain described in Japanese Patent Application Laid-open No. 2008-025744, as shown in FIG. 5, during the running of the chain, the lubricating oil L between the plate 130 and the chain guide G moves from the wider gap between the chain guide G and a front portion in the chain running direction of the plate 130 into the confined gap between the chain guide G and a portion near the apex of the guide-side end face 131, so that a Couette flow is generated due to the wedge effect. This creates a dynamic pressure that causes the chain guide G and the plate 130 to move away from each other, and the friction resistance when the chain runs can thus be reduced.

The wedge effect mentioned above is an effect of creating a pressure, i.e., a load bearing capacity, by a fluid having viscosity (lubricating oil) drawn into a wedge-shaped gap reducing in size toward the direction of motion ("Lubrication Terminology" P25: Japan Society of Lubrication Engineers, Jul. 20, 1981). The Couette flow mentioned above is a flow created in a fluid filled between two flat parallel plates when one of the plates is moved relative to the other that is kept stationary ("Dictionary of Science & Technology" P387: Editorial Board of Dictionary of Science & Technology, Tokyo University of Science, Mar. 28, 1996).

SUMMARY OF THE INVENTION

In the chain described in Japanese Patent Application Laid-open No. 2008-025744, friction resistance when the chain runs can be reduced because of the dynamic pressure created to cause the chain guide G and the plate 130 to separate from each other on the front side of the apex of the guide-side end face 131 of the running chain as described above. However, there was a problem that, on the rear side of the apex of the guide-side end face 131 of the running chain, the gap between the chain guide G and the plate 130 was gradually increased in distance, so that a negative pressure was created by the lubricating oil L flowing in this gap. The negative pressure causes the chain guide G and the plate 130 to attract each other, and consequently increases the friction resistance during the running of the chain.

Accordingly, the present invention solves these problems, its object being to provide a chain that can reduce friction resistance between the running chain and a chain guide with a simple structure.

The present invention solves the problems described above by providing a chain formed of a plurality of plates including a sliding plate that is slidably guided by a chain guide, the plates being coupled together with a connecting pin such that the chain is bendable. The sliding plate includes a guide-side end face arranged on the chain guide side. The guide-side end face includes a recessed section formed by cutting away part of the guide-side end face, and a guide sliding section located on a front side in a chain running direction of the recessed section. The recessed section includes a negative pressure canceling surface at a front end thereof in the chain running direction.

According to one aspect of the present invention, the guide-side end face of the sliding plate includes a recessed section formed by cutting away part of the guide-side end face, and a guide sliding section located on the front side in the chain running direction of the recessed section. The recessed section includes a negative pressure canceling surface at the front end in the chain running direction. Any oil film that may be formed by lubricating oil entering the gap between the chain guide and the guide-side end face of the sliding plate during the running of the chain can be cut off by the negative pressure canceling surface formed at the front end of the recessed section. Thus, creation of a negative pressure that will cause the chain guide and the sliding plate to attract each other on the rear side in the chain running direction of the guide sliding section can be prevented. This way, friction resistance between the running chain and the chain guide can be reduced with a simple structure.

According to another aspect of the present invention, the front end in the chain running direction of the recessed section is foamed at a center or on a rear side of the center in the chain running direction of the guide-side end face. The sliding plate can be designed such that it makes contact with the chain guide at the center in the chain running direction of the guide-side end face as with normal plates. Therefore, the chain can be designed similarly to chains that use normal plates.

According to another aspect of the present invention, the guide sliding section is shaped such as to come closer to the chain guide from the front end toward the rear end in the chain running direction. This way, lubricating oil can be introduced between the guide sliding section and the chain guide, so that a dynamic pressure can be created to cause the guide sliding section and the chain guide to separate from each other with the wedge effect.

According to another aspect of the present invention, the recessed section has a depth dimension in a plate height direction of 100 μm more at the front end thereof in the chain running direction. This prevents lubricating oil in the engine from entering the gap between the chain guide and the recessed section of the sliding plate by the capillary action and allows instead introduction of air into this gap, so that any oil film that may be formed in the recessed section of the sliding plate can be cut off reliably.

BRIEF DESCRIPTION OF THE DRAWINGS

FIG. 5 is an illustrative diagram for explaining how a plate slides on a chain guide in a conventional chain.

DESCRIPTION OF THE PREFERRED EMBODIMENTS

A chain 10 according to one embodiment of the present invention will be hereinafter described with reference to the drawings.

Figure 1:
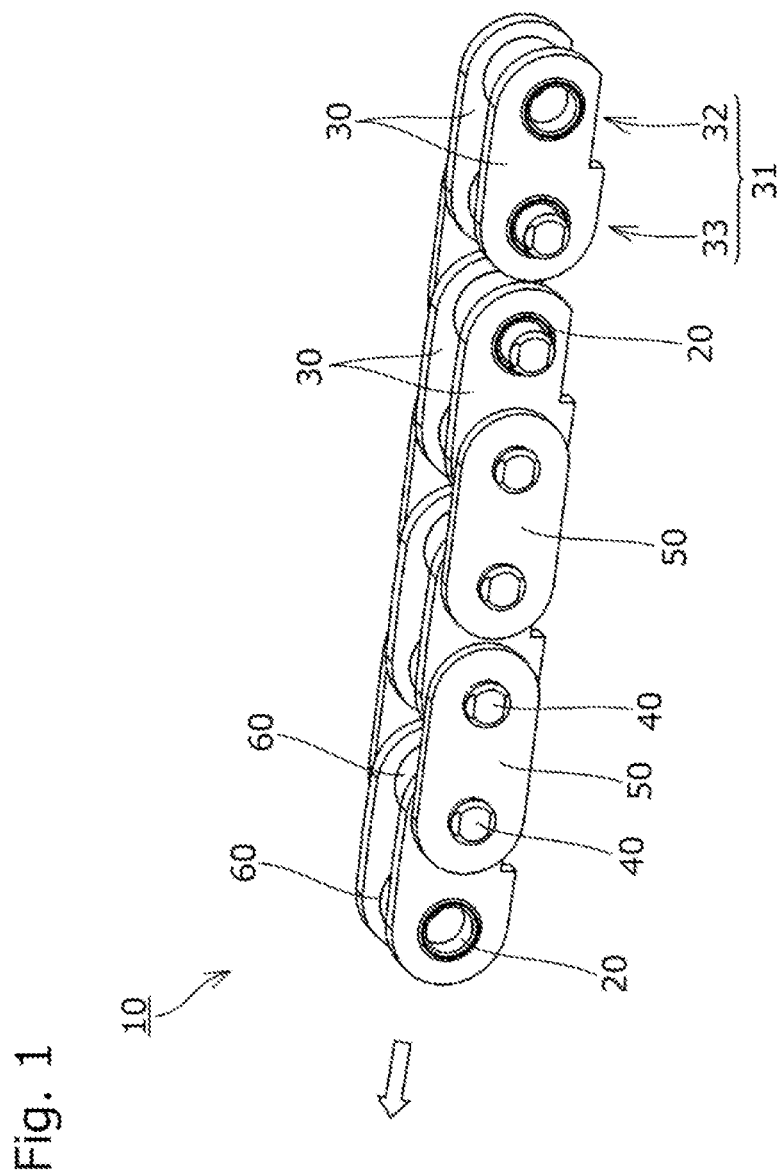
FIG. 1 is a perspective view illustrating a chain according to one embodiment of the present invention.

The chain 10 of this embodiment is formed as a timing chain used in a car engine and includes, as shown in FIG. 1, a plurality of inner links each formed of a pair of left and right inner plates 30 with a pair of front and rear bushings 20 fixed at both ends thereof in bushing holes, a plurality of outer links each formed of a pair of left and right outer plates 50 with a pair of front and rear connecting pins 40 fixed at both ends thereof in pin holes, and rollers 60 fitted on the bushings 20. These inner links and outer links are alternately connected to each other so as to be bendable along the longitudinal direction of the chain by inserting the connecting pins 40 in the bushings 20.

In this embodiment, the inner plates 30 are designed to be larger in the plate height direction than the outer plates 50 so that only the inner plates 30 slide on the chain guide G. In other words, the inner plates function as sliding plates slidably guided by the chain guide G.

The inner plates 30 each include a guide-side end face 31 arranged on the chain guide side.

Figure 2:
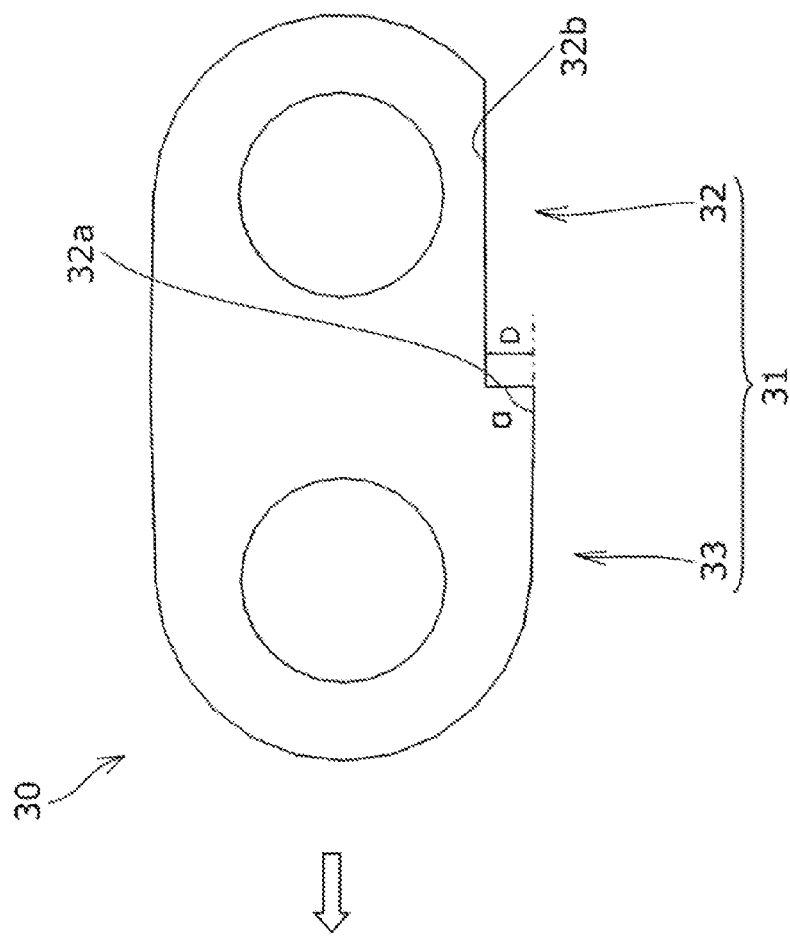
FIG. 2 is a plan view illustrating a sliding plate.

In this embodiment, this guide-side end face 31 is curved such that it is slightly convex in the center in the chain running direction as shown in FIG. 2. Namely, a guide sliding section 33 to be described later is shaped such that it comes closer to the chain guide G from the front end toward the rear end in the chain running direction. However, considering that the chain guide G has a guide surface G1 that is convexly curved, the guide-side end face 31 (guide sliding section 33) may be formed as a flat surface parallel to the chain running direction.

The guide-side end face 31 includes, as shown in FIG. 2, a recessed section 32 formed by cutting away a rear side in the chain running direction of the guide-side end face 31, and the guide sliding section 33 located on the front side in the chain running direction of the recessed section 32.

The recessed section 32 includes a flat negative pressure canceling surface 32a at the front end in the chain running direction as shown in FIG. 2. In this embodiment, this negative pressure canceling surface 32a is formed such that the angle α between the surface and the rear end face in the chain running direction of the guide sliding section 33 is 90°.

The specific form of the negative pressure canceling surface 32a is not limited to this flat shape and the negative pressure canceling surface 32a may be curved.

The recessed section 32 includes a following surface 32b on the rear side in the chain running direction of the negative pressure canceling surface 32a as shown in FIG. 2. This following surface 32b is formed to extend from the top end of the negative pressure canceling surface 32a toward the rear side in the chain running direction such as to face the chain guide G.

The following surface 32b may have any specific form; it may be formed of a plurality of flat surfaces, or a plurality of curved surfaces, or a combination of flat and curved surfaces. In other words, the plate may have any shape on the rear side in the chain running direction of the negative pressure canceling surface 32a.

Figure 4:
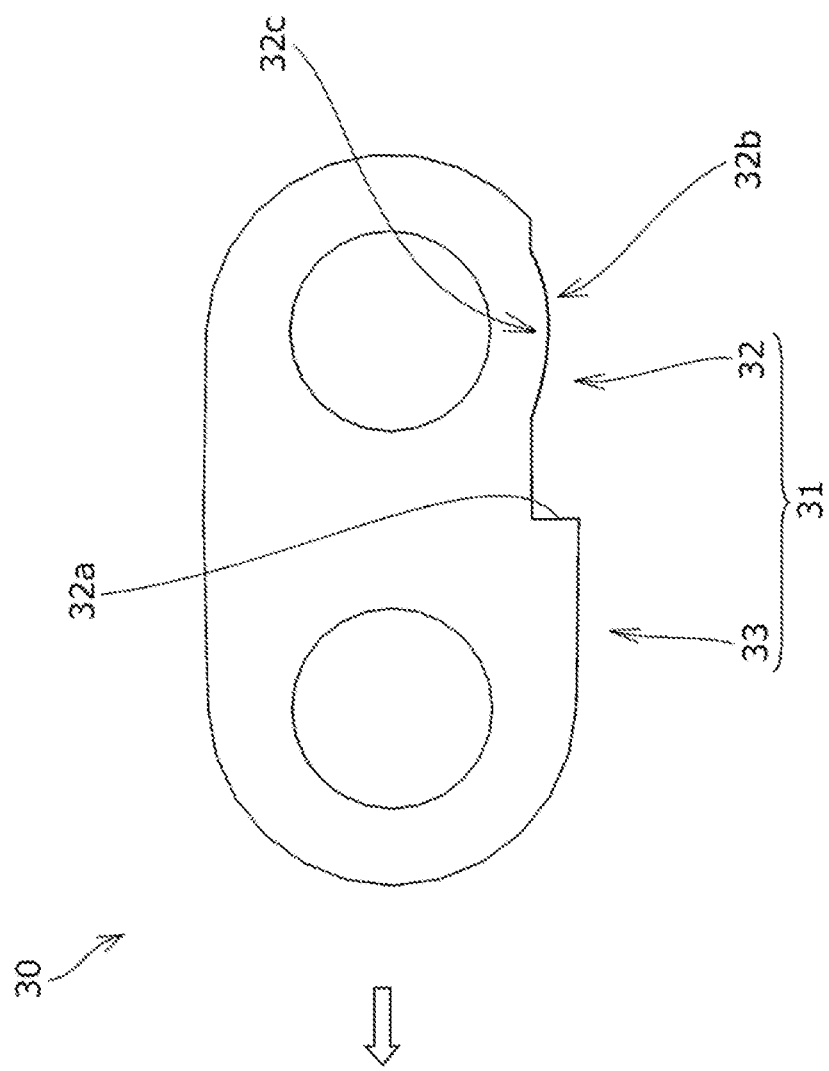
FIG. 4 is a plan view illustrating a variation example of the sliding plate.

For example, the following surface 32b may be formed such that there is a plate protrusion 32c below the bushing hole as shown in FIG. 4 so as to secure the plate strength around the bushing hole in the inner plate 30 (or pin hole in the outer plate 50 if the outer plate is the sliding plate).

The front end in the chain running direction of the recessed section 32 is formed at a center or on a rear side of the center in the chain running direction of the guide-side end face 31. In this embodiment, the front end is formed at the center of the guide-side end face 31.

Figure 3:
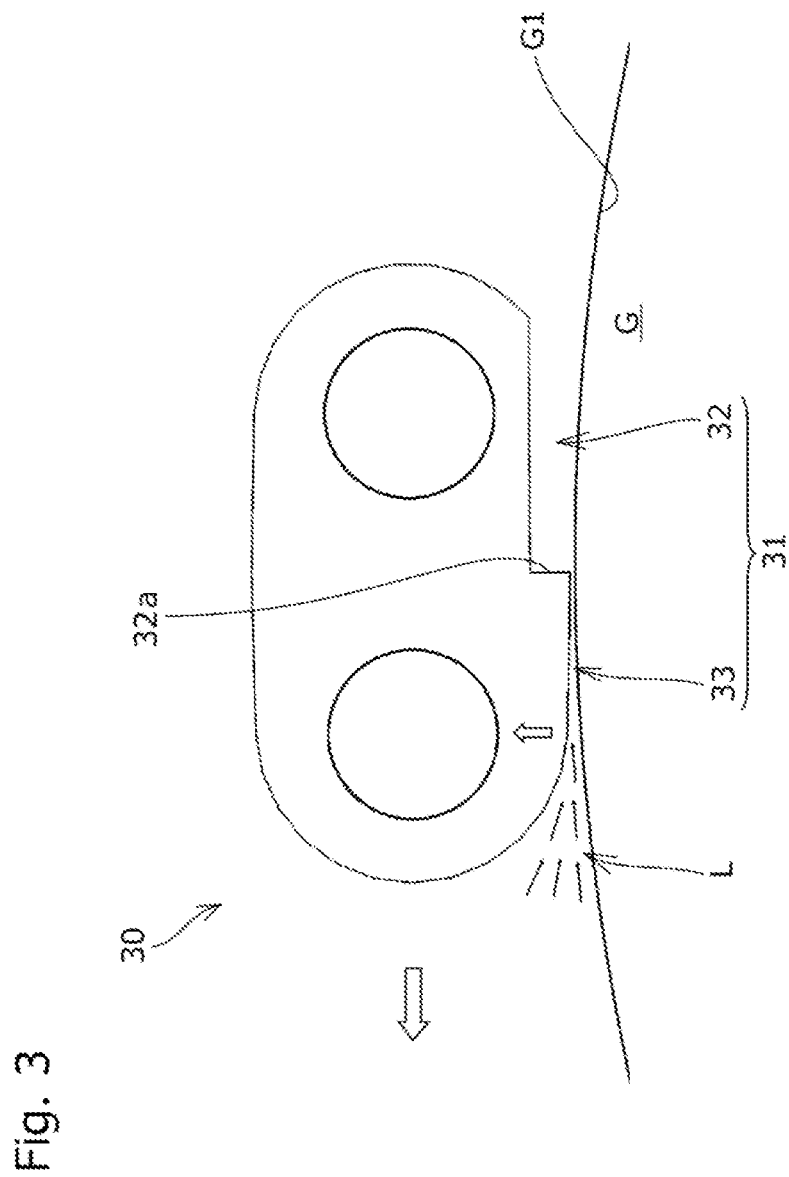
FIG. 3 is an illustrative diagram for explaining how the sliding plate slides on a chain guide.

It is preferable to form the front end in the chain running direction of the recessed section 32 at the center of the guide-side end face 31 when, as in this embodiment, the guide-side end face 31 is curved such that it is slightly convex in the center in the chain running direction, so that no negative pressure will be created on the rear side in the chain running direction of the apex of the guide-side end face 31 while a dynamic pressure is being created in a direction in which the chain guide G and the guide-side end face 31 separate from each other by the wedge effect on the front side in the chain running direction of the apex of the guide-side end face 31 as shown in FIG. 3.

The depth dimension D in the plate height direction of the recessed section 32 at the front end thereof in the chain running direction is set to be 100 μm or more as shown in FIG. 2.

While the embodiment of the present invention has been described in detail, the present invention is not limited to the above-described embodiment and may be carried out with various design changes without departing from the scope of the present invention set forth in the claims.

For example, while the chain was described as a roller chain in the embodiment above, the chain may have any specific form such as a bushing chain, as long as the chain includes a sliding plate that is guided by a guide surface of a chain guide.

Also, while the chain was described as a timing chain used for a car engine in the embodiment above, the chain may be used for any specific purposes.

While the inner plate alone was described as the sliding plate that is guided by a shoe surface of the chain guide in the embodiment above, any of the plurality of plates may be formed as the sliding plate. For example, the outer plate alone may be formed as the sliding plate, or all the plates (inner and outer plates) may be formed as sliding plates.

The guide sliding section that slides on the chain guide may be provided also on the rear side in the chain running direction of the recessed section of the guide-side end face.

While the angle α between the rear end face in the chain running direction of the guide sliding section and the negative pressure canceling surface was described as 90° in the embodiment above, the angle α may be set as any other angles such as 80°, 100°, and the like. It is preferable that the angle α be not more than 90°, since, if the angle α is 90° or less, a gradual increase in the distance between the chain guide and the sliding plate on the rear side in the chain running direction of the guide sliding section will be avoided, whereby creation of a negative pressure that will cause the chain guide and sliding plate to attract each other can be reliably prevented.

The angle α mentioned above refers to a designed angle. Namely, while respective corners of the plates are inevitably rounded to some extent because of plate polishing processes or the like necessarily involved in the production of the plates, the angle α as used herein refers to the designed angle before the corners are rounded.

What is claimed is:

1. A chain formed of a plurality of plates including a sliding plate that is slidably guided by a chain guide, the plates being coupled together with a connecting pin such that the chain is bendable, the sliding plate including a guide-side end face arranged on the chain guide side, the guide-side end face including only one recessed section formed by cutting away part of the guide-side end face, and only one guide sliding section located on a front side in a chain running direction of the recessed section, the guide-side end face being formed so as to slide on the chain guide with only the guide sliding section located on a front side in a chain running direction of the recessed section, the recessed section including a negative pressure canceling surface at a front end thereof in the chain running direction, and the front end in the chain running direction of the recessed section being adjacent a rear end of the guide sliding section and formed at a center or on a rear side of the center in the chain running direction of the guide-side end face.

2. The chain according to claim 1, wherein the guide sliding section is shaped such as to come closer to the chain guide from a front end toward a rear end thereof in the chain running direction.

3. The chain according to claim 1, wherein the recessed section has a depth dimension in a plate height direction of 100 μm or more at the front end in the chain running direction.

* * * * *